United States Patent
Feißt

(10) Patent No.: US 12,463,417 B2
(45) Date of Patent: Nov. 4, 2025

(54) ELECTRICAL CIRCUIT BREAKER FOR PROTECTING ENERGY DISTRIBUTION IN AN INDUSTRIAL PLANT

(71) Applicant: Murrelektronik GmbH, Oppenweiler (DE)

(72) Inventor: Heiko Feißt, Schlierbach (DE)

(73) Assignee: Murrelektronik GmbH, Oppenweiler (DE)

( * ) Notice: Subject to any disclaimer, the term of this patent is extended or adjusted under 35 U.S.C. 154(b) by 202 days.

(21) Appl. No.: 18/339,268

(22) Filed: Jun. 22, 2023

(65) Prior Publication Data
US 2023/0402836 A1    Dec. 14, 2023

(30) Foreign Application Priority Data

Jun. 24, 2022  (EP) .................................... 22181033

(51) Int. Cl.
  *H02H 7/26*   (2006.01)
  *H01R 31/06*  (2006.01)

(52) U.S. Cl.
  CPC ........... *H02H 7/268* (2013.01); *H01R 31/065* (2013.01)

(58) Field of Classification Search
  CPC ............ H02H 3/04; H02H 3/06; H02H 3/021; H02H 3/006; H02H 3/087; H01H 71/04; H01H 71/082; H01H 71/74; H01H 71/0228; H01H 71/7409; H01H 71/0207; H01H 71/08; H01H 71/1009
  See application file for complete search history.

(56) References Cited

U.S. PATENT DOCUMENTS

| | | | |
|---|---|---|---|
| 2002/0021226 A1 | 2/2002 | Clement et al. | |
| 2008/0231410 A1 | 9/2008 | Doljack et al. | |
| 2012/0327563 A1* | 12/2012 | Cook | H02J 4/00 361/624 |
| 2017/0294282 A1* | 10/2017 | Thorat | H01H 71/128 |
| 2022/0021210 A1* | 1/2022 | Cairoli | H02J 13/00006 |
| 2022/0051864 A1* | 2/2022 | Daoura | H01R 13/7135 |

FOREIGN PATENT DOCUMENTS

| | | | | |
|---|---|---|---|---|
| DE | 102013018292 A1 | 5/2014 | | |
| EP | 0119187 A1 | 9/1984 | | |
| EP | 1179827 A1 | 2/2002 | | |
| WO | WO-2013062420 A1 * | 5/2013 | ........... | H01R 9/2466 |

OTHER PUBLICATIONS

WO 2013062420 A1 Translation (Year: 2013).*

* cited by examiner

*Primary Examiner* — Bryan R Perez
(74) *Attorney, Agent, or Firm* — Walter Ottesen

(57) ABSTRACT

The disclosure relates to an electrical circuit breaker for protecting a power distribution system in an industrial plant (30) with electrical consumers (5) distributed in the plant. Electrical power is supplied to the electrical consumers (5) via a power-supplying line branch (7) of the power distribution system. For protecting the consumers, an electrical circuit breaker (20) is arranged in the power-supplying line branch (7). The electrical circuit breaker (20) is accommodated in a closed housing (10). The housing (10) has at least one first contact (11) for the power-supplying line branch (7) and at least one second contact (12) for an electrically protected line branch (8) which is connected to the electrical consumer (5).

20 Claims, 3 Drawing Sheets

ELECTRICAL CIRCUIT BREAKER FOR PROTECTING ENERGY DISTRIBUTION IN AN INDUSTRIAL PLANT

CROSS-REFERENCE TO RELATED APPLICATION

This application claims the benefit of European Patent Application EP 22181033.6 filed on Jun. 24, 2022, the contents of which are incorporated by reference in their entireties.

TECHNICAL FIELD

The disclosure relates to an electrical circuit breaker module for protecting the power distribution system in an industrial plant such as an automation plant or an intralogistics plant. Such plants include production or conveyor systems having a large number of electrical consumers such as actuators and/or sensors. The electrical power required for operation is supplied to the various consumers distributed in the industrial plant via line branches of the power distribution system.

BACKGROUND

Increasingly complex industrial plants comprise distributed systems. Control cabinets in industrial plants are to be designed with minimized construction volumes or eliminated altogether. This makes the power distribution system itself and the protection of electrical consumers connected to the power distribution system increasingly difficult. In a control cabinet, a distribution of current and voltage is realized via high line cross-sections and circuit breakers to smaller line cross-sections. If a control cabinet is omitted, protecting the individual electrical consumers in the plant is problematic.

SUMMARY

The disclosure is based on the object of proposing an electrical circuit breaker module with which reliable, decentralized protection of the power distribution system in an automation plant is possible in a simple and flexible manner.

The object is achieved by an electrical circuit breaker module which is arranged in a power-supplying line branch and with which a consumer is connected to the power distribution system. An electrical circuit breaker is accommodated in a closed housing. The housing has at least one first contact for the power-supplying line branch and at least one second contact for an electrically protected line branch connected to the electrical consumer. The line branch comprises at least one line pair for electrical power supply. In an advantageous further development, the line branch also comprises an FG potential (functional ground) and/or at least one other independent power supply.

The power distribution system is fed from a power source, which can be an AC/DC converter, a DC/DC converter, a switching power supply, a transformer, or a battery pack. Thus, a power supply unit used can convert a line voltage into a low voltage in the range of 12V to 60V, preferably converting it into a rectified low voltage. The main branch of the power distribution system is designed with a larger line cross-section of up to 16 mm², while the line branch branching off from the power distribution system to the consumer can be designed with a smaller line cross-section. The protected line branch to the consumer advantageously has a line cross-section between 0.5 mm² and 2.5 mm².

The housing with the integrated circuit breaker forms an independent component or module, which can be used anywhere in an industrial plant as required. Without great effort, existing and/or retrofitted consumers of the plant may be protected by serially connecting the module into the line branch supplying power to the consumer. If an electronic, parameterizable circuit breaker is provided in the housing, it can be easily parameterized according to the operating data of the connected consumer.

It is advantageous to design the housing to be closed on all sides. In particular, the housing is a housing of protection class IP20 or higher, advantageously a housing of protection class up to IP69k. In the plant, housings of protection classes IP54 to IP68 are expediently used. A high protection class enables the use of the electrical circuit breaker even in critical environments with high dirt or moisture loads.

In order to be able to be used flexibly in different plants, it is provided to design the housing with the electrical circuit breaker as an intermediate plug. The intermediate plug forms an independent component or module, which can be used in the plant at a suitable location.

It can be advantageous to design the housing of the intermediate plug with a further contact, in particular to design the housing as a T-plug or H-plug. The power-supplying line branch is expediently passed through from the first contact to the other contact. Advantageously, all lines and/or electrical potentials are passed on to the following devices. In particular, this refers to power lines (power-carrying lines) and in particular to FG lines. The line branch to the consumer branches off from the power-supplying line branch and is connected to the protected line branch to the consumer via the circuit breaker arranged in the housing. In an advantageous configuration, further signals or potentials from the line branch of the power supply are made available to the consumer, in particular FG lines and/or further voltage potentials.

In a particular further development, at least one contact of the housing is designed as part of an electrical plug-in contact for a line branch to be connected. Advantageously, all connections of the housing are designed as part of electrical plug-in contacts. The use of electrical plug-in contacts ensures easy removal of the component from the housing with electrical circuit breaker and plug-in contacts from the line branches of the power distribution system. It is possible to simply replace destroyed circuit breakers as well as to exchange a housing with a first circuit breaker for a housing with a second circuit breaker with other operating parameters, for example other circuit breaker values. In particular, it is provided that the first contact of the housing is designed as part of an electrical plug-in contact for connecting the power-supplying line branch and the second contact of the housing is designed as part of an electrical plug-in contact for connecting the electrically protected line branch to the consumer.

In an advantageous further development, the plug-in contact is formed by a plug-in connection. Such a plug-in connection can be formed by a socket and a plug. Advantageously, an M12-socket and an M12 plug form the plug-in connection. A plug-in connection consisting of an M8 plug and an M8-socket can also be used.

In another embodiment of the module comprising a housing and a circuit breaker, it is provided that at least one contact of the housing is designed as part of an electrical plug-in contact for connecting an expediently outgoing, power-supplying line branch or for connecting the electrically protected line branch. The other contact of the housing has a cable firmly connected to the circuit breaker in the housing. The connected cable is advantageously provided at its free end with a plug or socket of a plug-in connection, which is compatible with the plug-in contacts used in the industrial plant.

Expediently, the housing with the circuit breaker is connected to the power distribution system via a plug-in contact, wherein the cable attached to the other contact of the housing in a hardwired manner can be pre-assembled in length as a connecting line to the electrical consumer.

In a further configuration, it can be expedient to provide a cable hardwired to the circuit breaker in the housing at the first contact of the housing as the power-supplying line branch and to provide a cable hardwired to the circuit breaker in the housing at the second contact of the housing as the electrically protected line branch. Expediently, the cables hardwired in the housing are provided at their free ends with a plug or socket of a plug-in connection, which is compatible with the plug-in contacts used in the industrial plant. The lengths of the firmly connected cables are advantageously pre-assembled to bridge the distance between the power distribution system in the industrial plant and the consumer to be connected. The housing with the circuit breaker is advantageously located in the middle between two cables pre-assembled with equal length; other arrangements may be expedient.

In a further configuration, it can be provided that the housing is designed as a piercing housing, which is applied directly to a power-carrying flat ribbon cable using piercing technology and provides the electrical connection to the circuit breaker. The protected line branch leads to the consumer via the circuit breaker integrated in the housing.

The electrical circuit breaker in the housing can be a thermomechanical circuit breaker such as a bimetal circuit breaker, an electronic circuit breaker, or a fuse. Advantageously, an electronic circuit breaker is installed in the housing. In a particular configuration, the electronic circuit breaker is self-resetting. This means, for example, that after the circuit breaker has tripped, for example due to overcurrent, the circuit breaker expediently closes again after a predetermined time has elapsed and allows power to again be supplied to the consumer. It can also be advantageous to design the electronic circuit breaker as a current limiter that prevents current from rising above a predetermined limit value.

The electrical circuit breaker provided in the housing protects a downstream circuit or line section from impermissible physical and/or electrical states. The permissible protective measures are often determined by standards. In particular, but not exclusively, the amount of power, voltage, current, frequencies and/or electrical pulses may be used as parameters. The electrical circuit breaker provided in the housing is designed to protect downstream components of the industrial plant or regions of the industrial plant and to react with suitable measures in the event of a fault.

It is advantageously provided to integrate a display device in the housing together with the circuit breaker. The state of the circuit breaker present in the housing can be visually displayed via the display device.

In a further development, it is provided to provide a communication unit in the housing next to the electrical circuit breaker, which is suitable for communicating operating states of the circuit breaker itself, such as for example the magnitude of the flowing current, the accumulated operating hours of the circuit breaker, the network quality of the power distribution system and the like. An optionally provided communication unit can communicate with a bus provided in the industrial plant. Not only may the communication unit be used to read out and centrally manage the operating parameters of the circuit breaker; it may also be used to change the operating parameters of the electronic circuit breaker from the outside, that is, the electronic circuit breaker can be parameterized according to the type and power consumption of the connected consumer.

Advantageously, the communication unit is a wireless communication unit that is designed to communicate via NFC, Bluetooth, IO-Link Wireless, WLAN and/or mobile radio standards such as LTE, 5G, or the like.

Further features of the invention are apparent from the claims, the description, and the drawings, in which exemplary embodiments of the invention are shown. The features mentioned in the claims along with the features given in the following description and the features shown in the drawings can be combined with one another, even if they are given for different exemplary embodiments.

DETAILED DESCRIPTION

Figure 1:
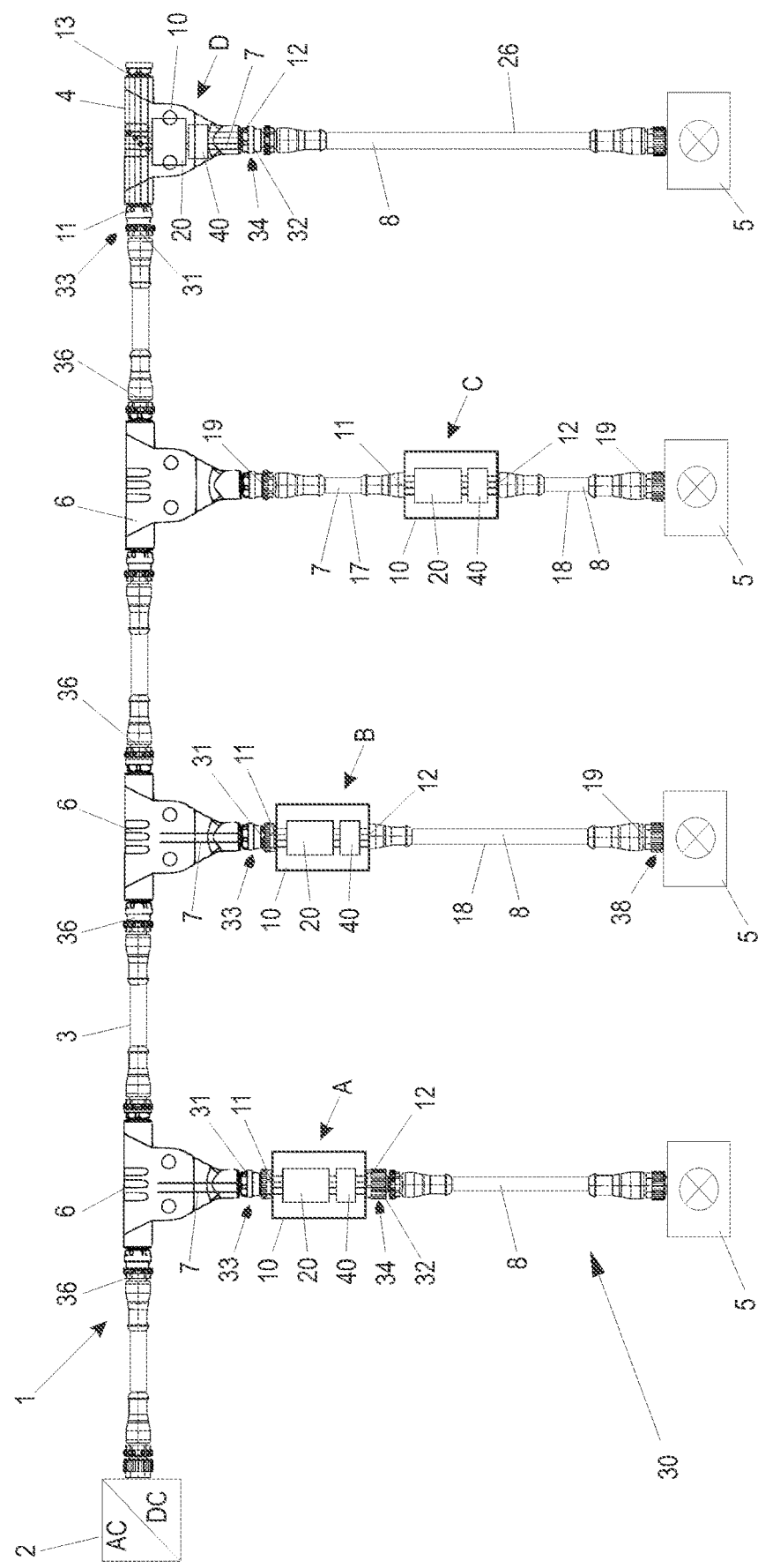
FIG. 1 is a schematic illustration of a power distribution system in an automation plant with electrical consumers.

FIG. 1 shows a power distribution system 1 for an industrial plant 30, which can be, for example, an automation plant or an intralogistics plant. Such industrial plants 30 include, for example, production systems and/or conveyor systems. In the industrial plant 30, electrical consumers 5 are arranged in a distributed manner. The consumers are centrally supplied with electrical power by a power distribution system 1. Consumers 5 may be actuators and/or sensors.

The power distribution system 1 for the industrial plant 30 is powered by a power supply unit 2, which in the exemplary embodiment shown transforms an AC voltage AC into a rectified low voltage DC. The AC voltage AC is taken from an AC network of, for example, 230V or 400V. The low voltage DC can be in the range between 12V to 60V. Preferably, the low voltage is 24V or 48V. The power supply unit is only indicated as an example. The power source can be an AC/DC converter, a DC/DC converter, a switching power supply unit, a transformer, a battery pack or other power source.

The low voltage DC is supplied to a main supply line 3. A communication bus 4 can be integrated in the main supply line 3. For the power supply of an electrical consumer 5, a branch 6 is provided in the main supply line 3, which can be designed as a T-piece. A line branch is branched off from the main supply line 3 via the branch 6, which forms a line branch 7 supplying electrical power to the consumer 5. The line branch 7 comprises at least one line pair for the electrical power supply. In an advantageous further development, the line branch 7 also comprises an FG potential (functional ground) and/or at least one further independent power supply.

A closed housing 10 with a circuit breaker 20 is provided between the power-supplying line branch 7 and the consumer 5. The housing 10 has a first contact 11 for the power-supplying line branch 7. The housing 10 further has a second contact 12 for a line branch 8 electrically protected by the circuit breaker 20. The line branch 7, which is branched off via the branch 6 and supplies power to the consumer 5, is connected to the protected line branch 8 via the circuit breaker 20. The connected electrical consumer 5 is electrically protected by the circuit breaker 20 in the housing 10.

The housing 10 is advantageously closed on all sides. In particular, the housing 10 is a housing of protection class IP20 to IP69k or higher. Preferably, the housing 10 is a housing of protection class IP54 to IP68.

The housing 10 with the electrical circuit breaker 20 can have different designs at its contacts 11 and 12. FIG. 1 shows various housings 10 with differently designed connections 11 and 12. The modules or independent components, as the case may be, each formed by the housing 10, the circuit breaker 20 in the housing 10, and an advantageously integrated communication unit 40 are identical in their basic features. The modules are designated by the letters A, B, C and D according to the variations of contacts 11 and 12. The explanations given for a module A, B, C or D apply in principle in the same manner to all other modules A, B, C or D.

Figure 2:
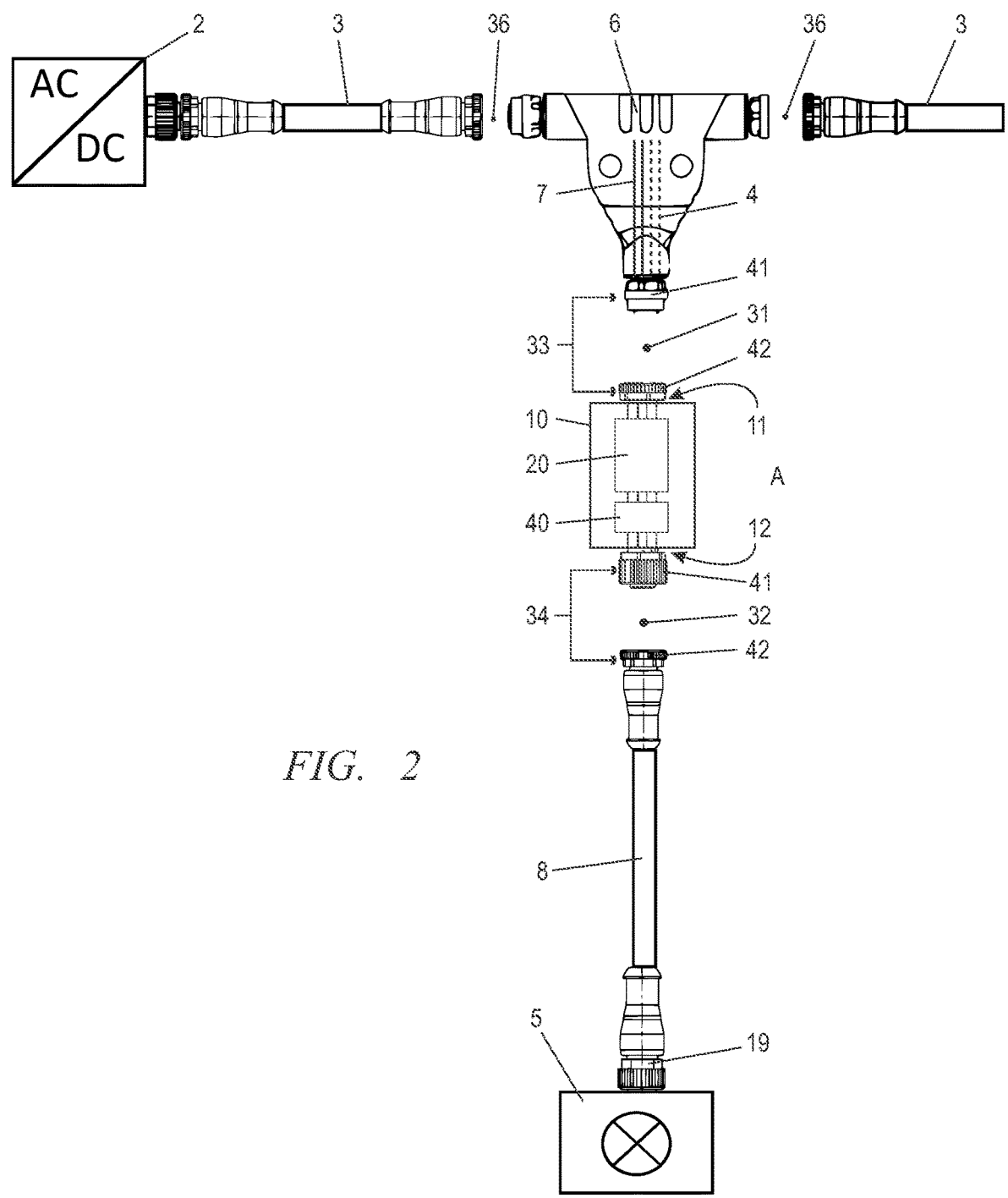
FIG. 2 is a schematic illustration of a housing with an electrical circuit breaker for insertion in a power-supplying line branch to a consumer.

In the first embodiment of the housing 10, which is shown as module A, all contacts 11 and 12 are designed as part of an electrical plug-in contact. In FIG. 2, module A is shown prior to insertion into the line branch 7 supplying power to the consumer 5. The contact 11 of the housing 10 is designed as a plug-in connection 31. The plug-in connection 31 is formed by a socket 41 and a plug 42, wherein the socket 41 can be formed on the branch 6 and the plug 42 can be formed on the housing 10. Accordingly, it can also be provided to provide a socket on the housing 10, which forms the plug-in connection 31 with a plug of the branch 6.

In accordance with the design of the plug-in contact 31, the plug-in contact 32 is formed on the contact 12 of the housing 10. The housing 10 can be provided with a socket 41, into which a plug 42 of the protected line branch 8 is plugged. A configuration can also be provided with which the housing 10 has a plug that forms the plug-in connection 32 with a socket at the end of the line branch 8.

In a particular configuration of the module A, the housing 10 is designed such that one contact 11 is designed as a plug 42 and the other contact 12 is designed as a socket 41. Thus, the housing 10 can be arranged in a simple manner between a main supply line 3 or the branch 6 of a main supply line 3 as the case may be, and a consumer 5 in the plant 30. It is expedient to open an existing plug-in connection between the power-supplying line branch 7 to the consumer 5 and the main supply line 3, in order to insert the housing 10 with the circuit breaker 20 into the power-supplying line branch 7 and to electrically protect the electrical consumer 5 via the circuit breaker 20 of the housing 10.

In the design of the housing as a module A, the housing 10 forms an intermediate plug, which can be used as needed anywhere in the industrial plant 30. Without much effort, existing and/or subsequently installed consumers 5 of the industrial plant 30 may be electrically protected by inserting the module A. For this purpose, only the line branch 7 leading from the main supply line 3 to the consumer 5 must be disconnected or the plug-in connection must be released, as the case may be, in order to then insert the open ends into the plug-in contacts 33, 34 of the housing 10.

The plug-in contacts 33 and 34 are designed as plug-in connections 31 and 32. It can be advantageous if the plug-in connections 31 and 32 are compatible with the plug-in connections 36 used in the industrial plant 30. Preferably, the plug-in connection 31, 32 and 36 consists of a socket 41 (FIG. 2) and a plug 42 (FIG. 2), in particular an M12 socket and an M12-plug. M8 sockets and M8-plug connectors or other sizes may also be advantageous.

The basic structure of the module B shown in FIG. 1 corresponds to the housing 10, the circuit breaker 20 integrated in the housing 10 and an optionally arranged communication unit 40 of the module A. Identical parts are provided with the same reference signs.

The housing 10 of the module B has a plug-in contact 33 at a first contact 11, which is designed as a plug-in connection 31. At the other, second, contact 12 a cable 18 is hardwired to the circuit breaker 20 in the housing 10. In the exemplary embodiment shown, the plug-in connection 31 of the first contact 11 is connected to the power-supplying line branch 7, which branches off from the main supply line 3 via the branch 6. The cable 18, which is connected in a hardwired manner to the other, second contact 12 of the housing 10, forms the electrically protected line branch 8 leading to the consumer 5.

The module B can also be designed in such a manner that a hardwired cable is connected to the contact 11, which forms the line branch 7 supplying power to the module B. Accordingly, the other contact 12 of the housing 10 of the module B is then designed as part of a plug-in connection, which may optionally be compatible with the plug-in connection 38 of the consumer 5. The module B can be plugged directly into the consumer 5. It can also be expedient to have an open end of the cable such that, for example, direct wiring to the consumer 5 is possible.

In a further design of the housing 10, a cable 17 hardwired to the circuit breaker 20 in the housing 10 can be provided at the first contact 11 of the housing 10 as the power-supplying line branch 7. In accordance with the illustration of the module C, a cable 18 hardwired to the circuit breaker 20 in the housing 10 is connected to the second contact 12 of the housing 10, which forms the electrically protected line branch 8 to the consumer 5.

As shown in the example of the module C, the housing 10 with the circuit breaker 20 and the optionally provided communication unit 40 is located between the branch 6 and the consumer 5. By varying the length of the cables 17 and 18, the position of the module C can be freely selected.

If hardwired cables 17 and/or 18 are connected to the housing 10, the free ends of the cables 17 and/or 18 may be designed with a plug or socket to form a plug-in contact 19. Optionally, such a plug-in contact 19 can be compatible with the plug-in connection used in the plant 30. The free end of a cable 17 or 18 can be electrically contacted in a simple manner by plugging it into the plug-in connection. The free ends of the cables 17 and/or 18 may also be provided as line ends.

The housing 10 of the module D corresponds in basic structure to the housings of the modules A, B or C. The housing 10 of the module D has a further contact 13, which in the exemplary embodiment of the housing 10 of the module D is provided as a third contact 13. In particular, the housing 10 is designed as a T-connector. Other forms of the plug with two or more connections may be expedient.

In the housing 10 of the module D, the power-carrying line branch 7 of the main supply line 3 is passed through from the first contact 11 to the third contact 13. The main supply line 3 is thus passed through the housing 10 of the module D. In the housing of the module D, the line 7 supplying power to the consumer 5 is branched off. The branch is connected to the circuit breaker 20, such that an electrically protected line branch 8 is available at the second contact 12. As shown on the module D, a cable 26 is plugged between the second contact 12 and the consumer 5, which cable connects the electrically protected line branch 8 to the consumer 5.

All connections 11, 12 and 13 of the housing 10 of the module D may optionally be designed as plug-in contacts for the line branch to be connected. This corresponds to the module A, with which the housing 10 also has all the connections 11 designed as plug connectors.

In particular, the module D can be designed as a piercing housing that is applied directly to a power-carrying flat ribbon cable using piercing technology. The flat ribbon cable runs via the contact 11 to the contact 13. The electrical connection to the circuit breaker is established via piercing elements engaging in the flat ribbon cable. Via the circuit breaker integrated in the housing, the protected line branch leads to the consumer via the contact 12.

The circuit breaker provided in the housing 10 of the modules A, B, C and D can be a thermometric mechanical circuit breaker such as, for example, a bimetallic circuit breaker, or can be a simple fuse. In an advantageous configuration of the invention, the circuit breaker 20 is designed as an electronic circuit breaker, as shown by way of example in FIG. 3.

The schematically shown housing 10 of the module A, B, C or D has a first contact 11 for the power-supplying line branch 7 and a second contact 12 for the electrically protected line branch 8.

An electronic switching element 22, which is controlled by a controller 23 is arranged in the current path 21 between the power supply unit 2 and the consumer 5. The controller 23 detects the current I flowing in the current path 21 via a current sensor 24 and compares its value with a limit value stored in the controller 23. The controller 23 can be designed to trigger the electronic switching element 22 when the stored limit value is reached and/or exceeded. In a first mode of operation, the controller 23 can limit the flowing current I, such that the stored limit value is not exceeded. In a second mode of operation, the controller 23 can open the current path 21, such that the consumer 5 is turned off. The modes of operation may also be combined with each other in such a manner that, for example, the current I is initially limited and only after a predetermined period of active current limitation does the controller 23 open the current path 21 and switch off the consumer 5.

Advantageously, the electronic circuit breaker 20 is designed in such a manner that after the switching element 22 is opened and a time predetermined in the controller 23 has elapsed, the switching element 22 is activated again and the current path 21 is closed again. If the current I detected via the current sensor 24 does not exceed the limit value again, the consumer 5 remains in operation.

Figure 3:
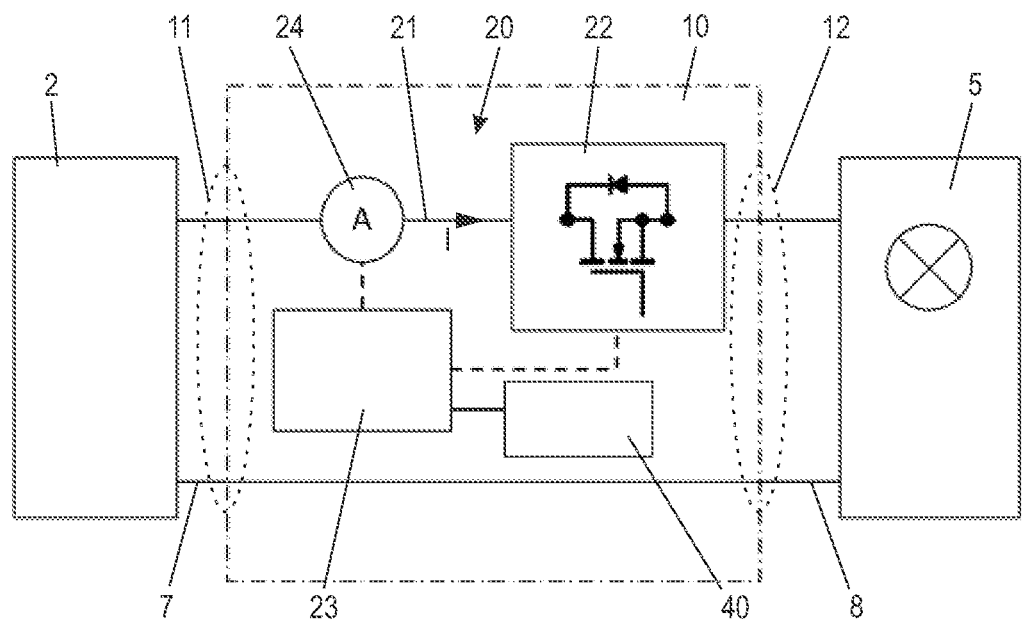
FIG. 3 shows an exemplary embodiment of a housing with an electronic circuit breaker.

The housing 10 of the electrical circuit breaker 20 optionally integrates a communication unit 40, as shown by way of example in the modules A, B, C and D and in FIG. 2. The communication unit 40 can be connected to a communication bus 4 that runs parallel to the power-carrying lines in the main supply line 3 and at least the power-supplying line branches 7 to the housing 10. The communication unit 40 can report operating parameters of the circuit breaker 20 to a higher-level monitoring unit via the communication bus 4. Thus, the operating states of the circuit breakers, the magnitude of the flowing current I, accumulated operating hours of the circuit breaker, the network quality of the protected voltage and the like may be displayed in the higher-level monitoring unit. In a particular further development of the invention, an electronic circuit breaker 20, as shown in FIG. 3, can be parameterized via the communication unit 40. For example, the limit value of the flowing current I, the increase of the flowing current I, an allowable time period of an overcurrent or the like may be changed via the communication unit 40 in the controller 23. The electronic circuit breaker 20 can be parameterized.

Instead of a hardwired communication bus 4, it can be advantageous to design the communication unit 40 as a wireless communication unit. The wireless communication unit can communicate with a higher-level unit via NFC, Bluetooth, IO-Link Wireless, WLAN and/or cellular standards such as 5G, LTE or the like.

Figure 4:
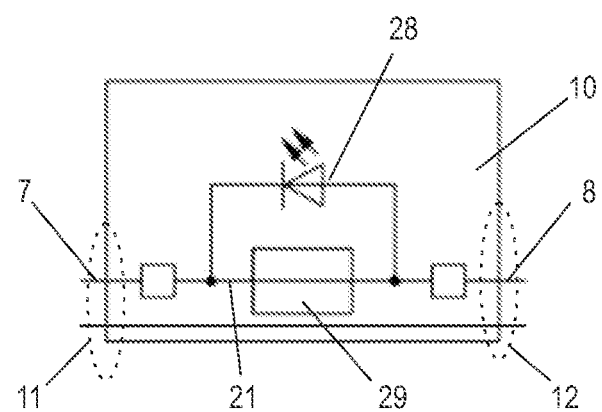
FIG. 4 shows an exemplary embodiment of a housing with a display device for the state of the circuit breaker installed in the housing.

In a further configuration of the housing 10, a display device 28 can be integrated into the housing 10. For example, FIG. 4 shows an optical display device that monitors a fuse 29. If the fuse opens the current path 21, the optical display device 28 responds and signals the destruction of the fuse 29.

What is claimed is:

1. An electrical circuit breaker module (20) for protecting a power distribution system in an industrial plant (30) with electrical consumers (5) being distributed in the industrial plant (30) and electrical power being supplied to the electrical consumers (5) via power-supplying line branches (7) of the power distribution system (1), the electrical circuit breaker module (20) comprising:
    an electrical circuit breaker (20) arranged in a power-supplying line branch (7);
    a closed housing (10) within which the electrical circuit breaker (20) is accommodated, the closed housing (10) comprising:
    a first contact (11) for the power-supplying line branch (7), and
    a second contact (12) for an electrically protected line branch (8),
    wherein the second contact (12) is connected to an electrical consumer (5);
        wherein the closed housing (10) is an intermediate plug comprising a further contact;
    wherein the intermediate plug is a T-connector, and
    wherein the power-supplying line branch (7) is passed through from the first contact (11) to the further contact (13).

2. The electrical circuit breaker module according to claim 1, wherein the closed housing (10) is closed on all sides.

3. The electrical circuit breaker module according to claim 1, wherein the closed housing is a housing of protection class IP20 to IP69k.

4. The electrical circuit breaker module according to claim 3, wherein the closed housing is a housing of protection class IP54 to IP68.

5. The electrical circuit breaker module according to claim 1, wherein at least one contact (11, 12) of the closed housing (10) is part of an electrical plug-in contact (33, 34) for a line branch (7, 8) to be connected.

6. The electrical circuit breaker module according to claim 1, wherein all contacts (11, 12, 13) of the closed housing (10) are part of an electrical plug-in contact (33, 34).

7. The electrical circuit breaker module according to claim 1,
wherein the first contact (11) of the closed housing is part of a first electrical plug-in contact (33) for connecting to the power-supplying line branch (7) and
wherein the second contact (12) of the closed housing (10) is part of a second electrical plug-in contact (34) for connecting to the electrically protected line branch (8) to the electrical consumer (5).

8. The electrical circuit breaker module according to claim 1, wherein the electrical circuit breaker (20) accommodated in the closed housing (10) is an electronic circuit breaker.

9. The electrical circuit breaker module according to claim 1, wherein the electrical circuit breaker (20) accommodated in the closed housing (10) is self-resetting.

10. The electrical circuit breaker module according to claim 1, wherein a display device (28) is integrated in the closed housing (10), which is suitable for displaying an operating state of the electrical circuit breaker (20).

11. An electrical circuit breaker module (20) for protecting a power distribution system in an industrial plant (30) with electrical consumers (5) being distributed in the industrial plant (30) and electrical power being supplied to the electrical consumers (5) via power-supplying line branches (7) of the power distribution system (1), the electrical circuit breaker module (20) comprising:
an electrical circuit breaker (20) arranged in a power-supplying line branch (7);
a closed housing (10) within which the electrical circuit breaker (20) is accommodated, the closed housing (10) comprising:
a first contact (11) for the power-supplying line branch (7), and
a second contact (12) for an electrically protected line branch (8),
wherein the second contact (12) is connected to an electrical consumer (5);
wherein the first contact (11) of the closed housing is part of a first electrical plug-in contact (33) for connecting to the power-supplying line branch (7) and
wherein the second contact (12) of the closed housing (10) is part of a second electrical plug-in contact (34) for connecting to the electrically protected line branch (8) to the electrical consumer (5); and,
wherein the plug-in contact (33, 34) is formed by a plug-in connection (31, 32) of a socket (41) and a plug (42).

12. The electrical circuit breaker module according to claim 11, wherein the closed housing (10) is an intermediate plug.

13. The electrical circuit breaker module according to claim 12, wherein the intermediate plug comprises a further contact (13).

14. The electrical circuit breaker module according to claim 13,
wherein the intermediate plug is a T-connector, and
wherein the power-supplying line branch (7) is passed through from the first contact (11) to the further contact (13).

15. An electrical circuit breaker module (20) for protecting a power distribution system in an industrial plant (30) with electrical consumers (5) being distributed in the industrial plant (30) and electrical power being supplied to the electrical consumers (5) via power-supplying line branches (7) of the power distribution system (1), the electrical circuit breaker module (20) comprising:
an electrical circuit breaker (20) arranged in a power-supplying line branch (7);
a closed housing (10) within which the electrical circuit breaker (20) is accommodated, the closed housing (10) comprising:
a first contact (11) for the power-supplying line branch (7), and
a second contact (12) for an electrically protected line branch (8),
wherein the second contact (12) is connected to an electrical consumer (5); and,
wherein:
the first contact (11) is an electrical plug-in contact (33) for connecting the power-supplying line branch (7) and the second contact (12) is hardwired to the electrical circuit breaker (20), or
wherein the second contact (11) is an electrical plug-in contact (33) for connecting the electrically protected line branch (8) and the first contact (11) is hardwired to the electrical circuit breaker (20).

16. An electrical circuit breaker module (20) for protecting a power distribution system in an industrial plant (30) with electrical consumers (5) being distributed in the industrial plant (30) and electrical power being supplied to the electrical consumers (5) via power-supplying line branches (7) of the power distribution system (1), the electrical circuit breaker module (20) comprising:
an electrical circuit breaker (20) arranged in a power-supplying line branch (7);
a closed housing (10) within which the electrical circuit breaker (20) is accommodated, the closed housing (10) comprising:
a first contact (11) for the power-supplying line branch (7), and
a second contact (12) for an electrically protected line branch (8),
wherein the second contact (12) is connected to an electrical consumer (5);
wherein a first cable (17) is hardwired to the electrical circuit breaker (20) in the closed housing (10) at the first contact (11) of the closed housing (10) as the power-supplying line branch (7); and,
wherein a second cable (18) is hardwired to the electrical circuit breaker (20) in the closed housing (10) at the second contact (12) of the closed housing (10) as the electrically protected line branch (8).

17. An electrical circuit breaker module (20) for protecting a power distribution system in an industrial plant (30) with electrical consumers (5) being distributed in the industrial plant (30) and electrical power being supplied to the electrical consumers (5) via power-supplying line branches (7) of the power distribution system (1), the electrical circuit breaker module (20) comprising:
an electrical circuit breaker (20) arranged in a power-supplying line branch (7);
a closed housing (10) within which the electrical circuit breaker (20) is accommodated, the closed housing (10) comprising:
a first contact (11) for the power-supplying line branch (7), and
a second contact (12) for an electrically protected line branch (8), wherein the second contact (12) is connected to an electrical consumer (5); and,
wherein a communication unit (40) is accommodated in the closed housing (10), the communication unit (40) being suitable:

for communicating operating states of the electrical circuit breaker (20) selected from the group consisting of a magnitude of a flowing current (I), accumulated operating hours of the electrical circuit breaker (20), network quality of a power supply, and/or for changing operating parameters of the electrical circuit breaker (20).

18. The electrical circuit breaker module according to claim 17, wherein the communication unit (40) is designed to communicate wirelessly via NFC, IO-Link Wireless, WLAN and/or mobile radio standards.

19. An electrical circuit breaker module (20) for protecting a power distribution system in an industrial plant (30) with electrical consumers (5) being distributed in the industrial plant (30) and electrical power being supplied to the electrical consumers (5) via power-supplying line branches (7) of the power distribution system (1), the electrical circuit breaker module (20) comprising:

an electrical circuit breaker (20) arranged in a power-supplying line branch (7);

a closed housing (10) within which the electrical circuit breaker (20) is accommodated, the closed housing (10) comprising:

a first contact (11) for the power-supplying line branch (7), and a second contact (12) for an electrically protected line branch (8), wherein the second contact (12) is connected to an electrical consumer (5); and, wherein the power-supplying line branch (7) carries a DC low voltage in a range between 12V to 60V.

20. The electrical circuit breaker module according to claim 19, wherein the DC low voltage is 24V or 48V.

* * * * *